United States Patent Office 3,536,978
Patented Oct. 27, 1970

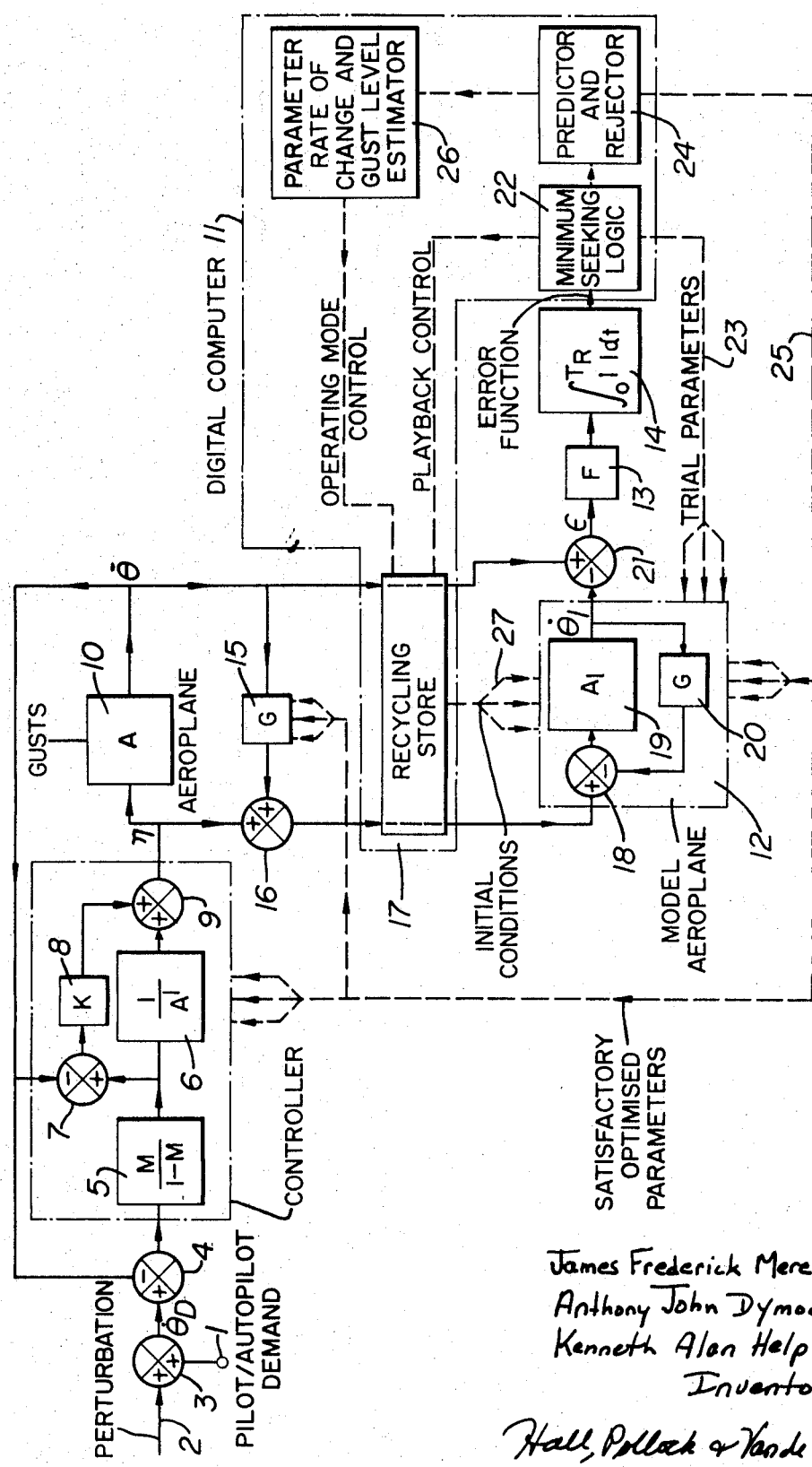

3,536,978
AUTOMATIC CONTROL
James Frederick Meredith, Cheltenham, Anthony John Dymock, Prestbury, Cheltenham, and Kenneth Alan Helps, Swindon Village, Cheltenham, England, assignors to Smiths Industries Limited, Cricklewood, London, England, a British company
Filed Apr. 25, 1968, Ser. No. 724,196
Claims priority, application Great Britain, Apr. 26, 1967, 19,277/67
Int. Cl. G05b *11/00*
U.S. Cl. 318—561                            12 Claims

ABSTRACT OF THE DISCLOSURE

A system is provided for the control of an entity, e.g., the pitch channel of an aircraft, whose behavior is governed by a transfer function of known form but including certain parameters which may vary. The actual response of the controlled entity to an input is compared with the response of a model to a corresponding input. The model has parameters corresponding to the parameters of the entity, settable to known values. The settings of the parameters of the model are systemmatically varied to minimize the discrepancy between the outputs of the controlled entity and the model. The values of the parameters which minimize the discrepancy thus give estimates of the values of the corresponding parameters of the controlled entity. These values are then set into a controller for the controlled entity, so that a desired relationship between the input to the controller (e.g., the demanded rate of pitch of the aircraft) and the output of the controlled entity (e.g., the actual rate of pitch of the aircraft) is achieved.

---

The present invention relates to automatic control systems, more particularly, but not exclusively, to automatic control systems for aircraft.

Automatic control systems are, in general terms, concerned with the control of an entity, e.g. an aeroplane, in such a fashion that an "output" from the entity, e.g. the attitude in relation to a frame of reference or the rate of change with respect to time of attitude, complies, within accepable limits, with demanded values of an input applied to the control system. Again in general terms, an automatic control system operates by performing appropriate mathematical operations on the demand and the output, to provide an input to the entity, e.g. the displacement of an appropriate aircraft control surface, such that, having regard to the characteristics of the entity, a required relationship between demand and output is achieved. Clearly the requirements for the input may change if the characteristics of the controlled entity change; and the achievement of changed requirements for the input necessitates adjustment of the control system during the course of operation, or adaptation. Adaptation may be carried out manually, but this is unlikely to be satisfactory and may well be dangerous. As a first alternative, adaptation may be carried out automatically, in accordance with changes in external factors which are known to affect the controlled entity in particular ways. For example, in the case of an aircraft, the characteristics of the system may be adjusted in accordance with predetermined functions of height, air speed and so on. This form of adaptation is widely used in the control of aircraft, but it has disadvantages, in particular in that the characteristics of the aircraft may depend significantly and in a complicated fashion on a large number of variables some of which may be difficult to measure accurately in flight. Thus, as a second alternative, adaptation may be carried out automatically in accordance with changes in the characteristics of the controlled entity itself as determined by examination of its behaviour in operation. This form of adaptation, referred to as "self-adaptation," is clearly preferable; but it will be appreciated that the determination of the relevant characteristics of the controlled entity presents considerable problems.

It is an object of the present invention to provide a self-adaptive automatic control system, by means of which the behaviour of a controlled entity may be controlled to give an overall response to demands which is largely independent of changes in the characteristics of the controlled entity itself.

According to the present invention, a self-adaptive control system for a controlled entity to which an input may be applied and which produces an output related to the input by a transfer function of a known form, A, but including parameters which may vary, the control system controlling the input to the entity in such a manner that the value of the output from the entity has a desired relationship to a demanded value of the output from the entity, this said relationship being defined by a model transfer function, M comprises means to vary the input to the controlled entity in accordance with the difference between the demanded value of the output and the actual value of the output, operated upon by a transfer function, R, equal to $(1/A')\{M(1-M)\}$, where $A'$ is a transfer function formally similar to A, but the parameters of which may be set to known values, means to record the values of the inputs to and the outputs from the controlled entity over a predetermined period of time, means to apply repeatedly the recorded values of the input quantity to a model device, said model device having a transfer function of the form $A_1/(1+RA_1)$, where $A_1$ is a transfer function formally similar to A, but the parameters of which are settable to trial values, means to determine the instantaneous difference between the output of the model device and the corresponding actual output of the controlled entity, means to derive from the said instantaneous difference over the predetermined period of time, means systemmatically to set sets of trial values of the parameters of the transfer function $A_1$, the error function being determined for each set of trial values and for the recorded values of the input and output quantities, means to select the set of trial parameter values giving a minimum value of the error function, and means to set the values of the parameters occurring in the transfer functions $A'$ and R to correspond to the selected set of trial values.

It will be appreciated that repeated recordings of the input and output quantities are made over succeeding periods of time, so that as the parameters of the transfer function A vary, corresponding sets of the parameters of the transfer function $A_1$ are selected to give a minimum of the error function, and are set into the transfer functions $A'$ and R.

Preferably, means are provided to apply to the demanded value of the output quantity a perturbation which is such as to activate the control system and the entity.

It is often the case that perturbations arise in, or may be applied to, the controlled entity in such a fashion that variations arise in the output which are not consequent upon variations in the demanded value of the output. In order to reduce the effect of such perturbations, there is preferably provided a further device having the transfer function R to which the output of the controlled entity is applied, and the output from which is added to the corresponding values of the input to the controlled entity before these are applied to the input of the model device.

The invention is most readily applicable to a controlled entity where transfer function $A_1$ contains a small number of independent parameters, preferably three or less.

The invention is particularly applicable to the control of an aircraft in pitch. The short period pitching motion of an aircraft is found to be governed by a transfer function containing four parameters, whose magnitude may vary both rapidly and over a very wide range during normal flight conditions. Thus, self-adaptation is highly desirable, and the relatively small number of parameters involved makes it possible to identify the parameters sufficiently rapidly to achieve satisfactory adaptation of the control system to the changes in the parameters.

An embodiment of the invention in which it is applied to the control of an aircraft in pitch will now be described with reference to the accompanying drawing which shows schematically a diagram of the complete system.

It has long been appreciated that the pitching motion of an aircraft has two components, one a relatively short-period motion and the other a long-period motion—see, for example, "Applied Aerodynamics" by Bairstow, published by Longmans, Green and Co., London, of 2nd ed., of 1939, chapter XIV, in particular the third complete paragraph on p. 760. The short-period pitching motion of an aircraft may be approximately represented by a second-order differential equation:

$$\theta/\eta = A = a(D+b)/(D^2+cD+d)$$

where $\theta$ denotes rate of change of pitch angle,

D denotes $d/dt$, the operator of differentiation with respect to time, $\eta$ denotes elevator angle, and $a, b, c, d$ are parameters which depend on the particular aircraft, and the flight conditions, height, airspeed, etc.

$a, b, c, d$ thus change, but in the short term can be regarded as constants and for brevity sometimes will be hereinafter referred to as constants.

It may be desirable to have a control system which, within acceptable limits, gives a relationship between $\theta$ and $\theta_D$, $\theta_D$ denoting demanded rate of pitch, which is independent of changes in $a, b, c, d$, i.e. $\theta = M\theta_D$. A suitable form for the "model" transfer function M, has been found to be:

$$M = \omega^2/(D^2 + 2\zeta\omega D + \omega^2)$$

The values of $\zeta$ and $\omega$ may be chosen to suit the type of aircraft concerned—for a civil transport $\omega$ could be 10/sec., and $\zeta$ could be 0.7.

The behaviour of a transfer function of this kind is well known and is, for example, discussed in "Theory of Servo Mechanisms" by James, Nichols and Philips, published by Longmans, Green and Co., London, 1947, at pp. 143, 144. However, other forms of model response M could be used if desired; and in particular it might be varied in accordance with, e.g. change of height, so that the overall response achieved by the system simulates that expected by the (human) pilot.

Referring now to the drawing, a $\theta_D$ signal is shown as derived by the addition of rate of pitch demand signals originating with either a human or automatic pilot 1, and perturbation signals, 2, by a first differential 3.

The $\theta_D$ signal is applied to one input of a second differential 4, a $\theta$ signal being applied to the other input (being sensed, for example, by a rate gyroscope mounted on the aircraft). The output of the second differential, which is thus a $(\theta_D - \theta)$ signal, is applied to a device 5 having a transfer function $M/(1-M)$ where M is the model transfer function for the desired response. The output of device 5 is applied to further device 6, having a transfer $1/A'$ where $$A' = a'(D+b')/(D^2 + c'D + a')$$

the quantities $a', b', c', d'$ being adjustable. A' is thus formally similar to A, but has known, adjustable, parameters $a'$ etc., as compared with the unknown parameters $a$ etc. of the aircraft. The output of device 5 is also applied to one input of a third differential 7, which has a $\theta$ signal fed to its other input. The output from differential 7 is applied through a device 8, having a transfer function K, which may, but need not, be a constant numerical multiplier, to one input of a further differential 9, the output of device 6 being applied to the other input of differential 9, and the sum of the inputs appearing at the output of the differential. K may be made proportional to $1/a'$, or could be chosen to give an appropriately damped and stable response of the system. A K chosen in this way would be desirable if the basic aeroplane is inadequately stable. The output of differential 9 is an $\eta$, elevator displacement, signal which, applied to an appropriate actuator (not shown), coupled to the elevator (not shown), produces a corresponding displacement of the elevator. This, by reason of the aeroplane characteristics, defining the aircraft transfer function A, produces a component of rate of pitch, $\theta$, of the aeroplane, which is indicated by the block 10.

It can be readily shown that if A' is made equal to A, i.e. the quantities $a', b', c', d'$ are made equal to $a, b, c, d$ respectively, the relationship between the component of $\theta$ arising from the component of the $\eta$ signal, in its turn arising from $\theta_D$ will be precisely the desired model response, M, whatever that may be; and the remainder of the system shown in the drawing is concerned with the determination of the aeroplane parameters $a, b, c, d$, and the adjustment of the corresponding parameters of the transfer function of blocks 6 and possibly 8 to be equal to them. The main elements of the remainder of the system are a digital computer, 11, comprising the devices shown within the corresponding chain dotted line, an aeroplane simulator 12 or model, shown within a further chain dotted line, and means to compute an error function, comprising devices 13, 14.

The $\theta$ signal is fed through a device 15 having a transfer function G to one input of a further differential 16, to whose other input the $\eta$ signal is fed. The two input signals to differential 16 are combined additively. Transfer function G is made equal to:

$$K/(1-M) + (1/A')\{M/(1-M)\}$$

or to an approximation to this. A simple approximation, sufficient for many purposes, is to make G equal to K, this being the asymptotic form of the above for high frequency signals.

The $\theta$ signal is fed to a re-cycling store 17 in the digital computer 11, as is also the signal from the output of differential 16—this latter signal being referred to hereinafter as a "compensated $\eta$" signal. The aircraft simulator 12 comprises a further differential 18, to one input of which the compensated $\eta$ signal is applied. The output of differential 18 is applied to a device 19 having a transfer function $A_1$ similar in form to A, but with adjustable parameters $a_1, b_1, c_1, d_1$ instead of $a, b, c, d$. The output of device $A_1$ indicated as a signal $\theta_1$ may be thought of as being the $\theta$ which would be obtained were an elevator angle corresponding to the compensated $\eta$ signal applied to an aircraft having the transfer function $A_1$. The $\theta_1$ signal is applied to a device 20 having a transfer function G, as earlier defined, whose output is applied to the other input of differential 18. The $\theta_1$ signal is also applied to one input of a further differential 21, to whose other input the corresponding $\theta$ signal, read out from store 17, is applied.

Thus the instantaneous output of differential 21, indicated as $\epsilon$, may be thought of as an instantaneous measure of the difference between the response of the real aeroplane to the actual elevator displacement, but modified by external perturbations applied to the aeroplane, and the response of the model aeroplane, modified by the feedback through the transfer function of device 20, to the compensated $\eta$ signal. It can be shown that the effect of the device 15 is to eliminate the effect of the gusts from the compensated $\eta$ signal, in a manner discussed below, so that the signal $\epsilon$ instantaneously gives a measure of the difference between the state of the real aeroplane, with transfer function A and as affected by gusts and model aeroplane, with transfer function $A_1$. An instantaneous measure of this kind is of little if any significance. To provide a significant measure of the difference between the performance of the real aeroplane and the model the signal $\epsilon$ is applied to the input of a phase-advance network 13, having a transfer function F, the absolute value of the output of network 13 is integrated by device 14, over a predetermined period of time, $T_R$, and the output from device 14, i.e.

$$\int_0^{T_R} |F\epsilon| dt$$

provides the requisite significant measure of the difference between the response of the real aeroplane and the model, and will be referred to as the "error function." The phase-advance network 13 is not essential, and its transfer function F is chosen on the basis of experience and experiment, to accentuate the more important components of the $\epsilon$ signal. Other meaningful forms of error function, for example, $$\int_0^{T_R} (F\epsilon)^2 dt$$

could be used, without affecting the overall operation of the system, but the error function chosen, $$\int_0^{T_R} |F\epsilon| dt$$

has the advantage of being particularly simple to compute.

The error function is fed into the digital computer 11, the computer operating, in fairly general terms, by systematically setting sets of values of the parameters $a_1$ to $d_1$ of the transfer function $A_1$, and determining the error functions for each set of values until a set of values is found giving a minimum, or at least an approximate minimum, of the error function. This set of values provides an estimate of the set of values of the parameters $a$ to $d$ of the real aeroplane, and the corresponding values are thereupon set into devices 6, 8, 15, and 20.

The minimum-seeking function of the computer is indicated by block 22, the setting of the sets of trial values of the parameters $a$ to $d$ being indicated by the line 23. When a set of parameters is found which appears to give a minimum, this is compared with previously-determined sets of parameters and if it is so related to previously-determined sets of parameters as to be acceptable, it is accepted, but otherwise it is rejected, this function being indicated by block 24, the setting of acceptable values of the parameters in devices 6, 8, 15 and 20 being indicated by the line 25.

So far, it has been indicated that compensated $\eta$ and $\theta$ signals are simply stored in store 17. In fact, improved performance may be achieved by more complex methods of storing the data, as discussed below, a choice being made as to the appropriate mode of operation in accordance with estimates of the prevailing conditions, and the rates of change with respect to time of the estimated parameters. This is indicated by block 26, to which appropriate signals are fed from block 24, and itself controlling the mode of operation of store 17.

It will be appreciated that the operation of model 12 may often conveniently be made faster, by a substantial factor, for example, of the order of 100, than the operation of the real aeroplane, so that the estimation of the aeroplane parameters from a sample of data gathered over a given period of time can be carried out, and the requisite adjustments made, subsequently over a fraction of that period of time.

At the beginning of each cycle of computation of a set of values for the parameters $a'$, $b'$, $c'$, $d'$, the model elevator displacement $\eta$, the model pitch rate $\theta$, and its time derivative $\dot{\theta}$ are preferably set to correspond to the aeroplane elevator displacement $\eta$ and the aeroplane pitch rate $\theta$ and its time derivative $\dot{\theta}$ at the beginning of the corresponding period of operation of the real aeroplane (the relevant information being derived from the store 17), is indicated by the lines 27. This setting is not essential but if it is not effected, the discrepancy between aeroplane and model performance produced by this, as distinct from discrepancies between the aeroplane and model constants, inevitably increases the error function, and makes the identification of the aeroplane parameters $a$, $b$, $c$, $d$ more difficult and less certain.

Methods whereby values of $a_1$, $b_1$, $c_1$, $d_1$ to minimize error function may be calculated will now be discussed. It is found, in the aircraft case, that for many aircraft parameter $c$ is to a sufficiently good degree of approximation, a constant multiple of $b$, for any particular aeroplane. Obviously a similar condition may be imposed on the parameters of the model, i.e. $c_1$ is made a constant multiple of $b_1$, the multiplier being that appropriate to the real aeroplane. The error function can thus be regarded as defining a surface in a four-dimensional space, the co-ordinates used being $a_1$, $b_1$, $d_1$ (or any appropriate functions of $a_1$, $b_1$, $d_1$ respectively) for the three independent variables, and the error function for the dependent variable; and it is desired to find a minimum in the error function, which could be thought of as a depression in the surface, the corresponding values of $a_1$, $b_1$, $d_1$ indicating the values of $a$, $b$, $c$ for the real aeroplane. Alternatively, fixed values of the error function can be thought of as defining surfaces in an ordinary three-dimensional Cartesian co-ordinate system. The co-ordinates in such a system may conveniently be taken as $x = \log_2 a_1$, $y = \log_2 b_1$, $z = \log_2 d_1$. Clearly a whole variety of procedures could be conceived whereby the error function at different, systematically-selected, points in the $(x, y, z)$ space referred to immediately above is computed, and a point giving a minimum, to an adequate degree of approximation, eventually selected.

An advantageous search procedure conducted in $x$, $y$, $z$, space uses as its basic unit the equilateral tetrahedron.

The search commences either at a point lying near the center of the (known) permissible region of $x$, $y$, $z$ or at the minimum point of the previous search.

With this point as its centroid and with a selected orientation, a tetrahedron with edge length unity is set up. The error function values at the points defined by the vertices of the tetrahedron are determined.

Taking the vertex which corresponds to the largest of the four error function values, a new point is constructed being the image of this vertex in the opposite face of the tetrahedron and the error function value corresponding to this point is determined. If this error function is smaller than that corresponding to the point whose image it is, then the tetrahedron formed by this new point and the remaining three points of the original tetrahedron become the current tetrahedron and the above procedure is repeated.

If, on the other hand, the image vertex has a larger error function value then, still considering the original tetrahedron, the point with the next largest error function is considered and an image point corresponding to it produced in the same manner and, depending upon the size of its error function value, one or other of the above alternatives is followed.

This process terminates when the current tetrahedron is such that the image of each vertex has an error function value larger than that corresponding to the vertex. When this state is reached a new tetrahedron is formed by taking the image of the current tetrahedron in the vertex having minimum error function. The error functions corresponding to three new points thus produced are determined. If any of these are smaller than the error function of the fourth vertex, then new points are generated from this tetrahedron in the manner described and the search continued as before.

If, on the other hand, none of the three new points have error function values less than that of the fourth vertex, then the search is continued as before with the exception that the formation of a new tetrahedron by reflecting in the minimum vertex of a current tetrahedron is not permitted if reflection in this vertex has occurred previously.

The vertex having the smallest error function value in the final tetrahedron of this search is made the centroid of a tetrahedron with edge length ¼ and the search continued exactly as for the case with edge length ½.

The co-ordinates of the minimum vertex of this search are taken as the estimates of the minimum point of the error surface, and thus as corresponding to the $a$, $b$, $d$, (and $c$) of the real aeroplane. In practice, it is found that the aeroplane parameters may be determined with errors in the neighborhood of ±10% after about 50 determinations of the error function. For example, it is found that for a recording period of 7 seconds with no substantial turbulence the probability of the "identified" parameters being within 10% of their true values is about 70%.

So far, the operation of the system has been discussed as the basis that recording of $\theta$ and compensated $\eta$ signals in the store 17 and processing of these signals to determine ($a$, $b$, $c$, $d$) proceed alternately. This involves a delay in determining the parameters ($a$, $b$, $c$, $d$), i.e. the values determined are not those corresponding to the real aeroplane when they are actually set in the devices 6 and 15, but those corresponding to the values ruling some appreciable period of time earlier. In flight regimes where these parameters are rapidly changing it may be desirable to reduce this delay, and for this purpose the recording of $\theta$ and compensated $\eta$ signals may be arranged to continue while the earlier recorded signals are being processed. Data is recorded over a period $T_r$ and processed over a period $T_p$. After the completion of the processing, the parameters are set, as described earlier; and immediately the computation of the parameters is recommenced, using data recorded over the period $T_r$ immediately preceding the recommencement of the computation. Thus, each parameter setting is used for a period $T_p$, and, the average delay between the time of use of a parameter setting and the information upon which it is based is clearly ½($T_r+T_p$). This mode of operation will be referred to as the "continuous identification" mode. By contrast, if recording and processing take place alternately, the average delay will be $T_r+⅜$, which is more than twice as long.

In other circumstances such as when turbulence is heavy, the normal recording time may be too short to permit confident accurate identification of the parameters $a$, $b$, $c$, $d$. In these circumstances, what may be called a "stacking mode" is used. In this mode, the record/identify cycle is as in the basic mode, but instead of the previously recorded information being erased, it is multiplied by a factor $m$, greater than zero and less than unity, and added to the fresh information. Thus, the information recorded in the "$n^{th}$" preceding cycle is effectively multiplied by the quantity $m^n$ and added to the fresh information for which the stacking mode has been in use. Since the perturbation applied at 2 is repetitive (as is explained below) and tied to the record/identify period whereas the effect of gusts on the aircraft is to produce variations of $\theta$ which are not so tied, the effective signal to noise ratio of the $\theta$ signals can be shown to be improved by a factor $(1-m)^{-½}$ (which is obviously greater than unity) if the stacking continues, and $m$ is kept constant, over a large number of cycles. The signal content of the $\theta$ signals is in this context to be reckoned as the component of those signals attributable to the perturbation demands applied at 2.

It will be appreciated that the continuous identification and stacking modes of operation are mutually exclusive, and that they are beneficial under different circumstances—the continuous identification mode is useful when the parameters $a$, $b$, $c$, $d$ are changing rapidly, whereas the stacking mode is useful when the parameters $a$, $b$, $c$, $d$ are changing slowly, but the level of turbulence is high. Which mode should be used is determined, as indicated by block 26, by consideration of the previous values of the constants $a$, $b$, $c$, $d$—the slope of the straight line providing the best fit for the previous "N" identifications of a particular parameter considered as a function of time, is obviously a measure of the rate of change of that parameter, and the scatter of the identifications about that line is a measure of the turbulence. Thus, a decision as to the use of the continuous identification mode or the stacking mode can be made by consideration of the scatter and the slope.

It was indicated earlier that the process of identification of the constants ($a$, $b$, $c$, $d$) could be considered as the location of the minimum in the error function surface, the error function being considered as plotted against values of ($a_1$, $b_1$, $d_1$), or ($x$, $y$, $z$). If the short period pitching motion of the uncontrolled aeroplane were very lightly damped, and no measures were taken to increase the damping, this minimum would be very sharply defined, so that the possibility that it would on occasions not be found by the identification procedure discussed earlier could not be neglected. The damping of the aeroplane motion could be improved, in known manner, by simply applying a component of elevator displacement, $\eta$, in the appropriate sense, proportional to $\theta$. If this were done, the transfer function of device 6 would no longer be $1/A'$, but the reciprocal of the transfer function of the real aircraft as modified by the damping feed-back. However, it can be shown that by not merely applying a $\theta$ signal to one input of differential 9 through device 8, which would produce the required damping, but also applying the output of device 5 to the input differential 9, via differential 7 and device 8, the damping may be improved, and the desired model response is achieved by making the transfer function of device 6 the reciprocal of that of the aircraft. This is advantageous in two respects—it both makes the identification of the parameters ($a$, $b$, $c$, $d$) easier by flattening the minimum of the error function, and makes the setting of the parameters ($a'$, $b'$, $c'$, $d'$) less critical. Furthermore, if the aeroplane is unstable, device 8 should have a transfer function such as to stabilize the system.

It will be appreciated that gusts acting on the real aeroplane produce variations in $\theta$ and, since the control system operates the elevator to counteract the effect of the gusts, the variations in $\eta$ will be correlated with the values of $\theta$ produced by the gusts. This means, of course, that if device 15 is omitted there will be a correlation between the $\eta$ and $\theta$ signals fed to the model by reason of their "gust" components, and it can be shown that this correlation will in general affect the identification of the parameters ($a$, $b$, $c$, $d$). If this correlation can be removed, the effect of gusts will be limited to increasing the error function; and the effect of device 15 is to remove this correlation. Its operation can perhaps best be seen by considering the aeroplane, 10, as a source of signals, produced by the action of gusts on it. These signals are fed, via devices 4, 5, 6, 7, 8, 9, to the output of differential 9. It can be seen that the transfer function for the $\theta$ signals fed via this path is $$-\{K/(1-M)+(1/A')M/(1-M)\}$$

Device 15 ideally has a transfer function $$G=\{K/(1-M)+(1/A')M/(1-M)\}$$

so that the effects of the gust signals, originating in the aeroplane, fed via devices 4, 5, 6, 7, 8, 9 and via device 15 cancel at the output of differential 16—device 15 may be thought of as a neutralising device as regards variations in the $\eta$ signals produced by gusts. It will be seen that the transfer function for the $\theta$ signals fed via devices 4 to 9 includes the term $K/(1-M)$, which indicates that, if K is increased, for the purposes discussed above, this will render the system more susceptible to gusts, unless device 15, having the appropriate "neutralising term" $K/(1-M)$ in its transfer function, is also used; the use of this enables the effect of gusts to be appreciably ameliorated. As indicated earlier, it may be quite satisfactory to make the transfer function of device 15 simply K.

It will of course be appreciated that device 20, associated with the aeroplane pitch transfer function model, device 19 with transfer function $A_1$, simulates the effect of device 15 on the operation of the "real" aeroplane in response to variations in $\eta$.

Thus, to re-capitulate, the output of differential 16 is a signal which ideally is uncorrelated with any gusts which affect the aeroplane, i.e. it is derived entirely from demands from the human pilot and automatic pilot demands applied at 1 and the perturbation demands applied at 2. This output is effectively applied to the aeroplane model $A_1$, and the response of the aeroplane model, to this output, is applied to one input of differential 21. The corresponding $\theta$ signal is applied to the other input of the differential and it will be appreciated that this $\theta$ signal includes not only the component of $\theta$ corresponding to motion of the aircraft in response to the output of differential 3, but also the component corresponding to motion of the aircraft under the influence of gusts. This latter component inevitably increases the magnitude of the error function appearing at the output of device 14, but, being uncorrelated with $\theta_1$, does not affect the computation of the aeroplane constants, except insofar as a greater amount of data may be required to enable the parameters ($a$ to $d$) to be identified with the same degree of certainty as in the absence of gusts.

It will be appreciated that identification of the aircraft constants can only be effected if there is an output from differential 3 to excite the system over the whole of the relevant frequency spectrum during each recording cycle. Frequently, normal automatic and manual pilot activity may be sufficient to ensure this, but in case this should not be so, it is preferred to feed a small perturbation into one input of differential 3, as indicated at 2. Provided that the perturbation has an appropriate frequency spectrum, and is preferably the same for each recording cycle, its precise form is relatively unimportant. However, a particularly convenient form of perturbation is provided by a pseudo-random binary code, or $m$ sequence. This is a periodic binary signal, the frequency-spectrum of which is closely similar to that of white noise over a limited bandwidth, and is easily generated by a digital computer. This signal provides the requisite excitation and it is more convenient to use sequences so generated to give the perturbation signals than to use, for example, a pre-recorded noise signal.

It will also be appreciated that the perturbation signal, repeating from cycle to cycle, is essential if the "stacking" mode of operation is used.

It will be noted that little reference has been made hitherto to the physical form of the devices indicated by blocks in the drawing; but it will be appreciated that these may take a wide variety of forms, as may be convenient in particular circumstances. They will usually nevertheless consist of electrical, mechanical or electromechanical devices, the requisite adjustments to the functions A', G, $A_1$ being made by appropriate adjustments to the setting of these devices. Similarly, the functional links indicated may take a wide variety of forms as may be appropriate in particular circumstances.

Furthermore, it will be seen that, for example, devices 4 to 9 need not be separate—as long as the requisite relationship between $\eta$, appearing at the output of differential 9, and $\theta$ and $\theta_D$ is achieved, and the constants appearing in $1/A'$ can be appropriately adjusted, the actual means whereby the relationship is achieved is unimportant.

Equivalent considerations also apply in relation to devices 19 and 20. However, it will frequently prove convenient to realize the functions performed by devices 4 to 9, 15, 16, and 18 to 21 by analogue, rather than digital, computing techniques.

We claim:
1. A self-adaptive automatic control system for a controlled entity to which an input may be applied and which produces an output related to the input by a transfer function of a known form and including parameters which may vary, the control system controlling the input to the entity in such a manner that the value of the output from the entity has a desired relationship to a demanded value of the output from the entity, comprising a controller device adapted to relate an input thereto and an output therefrom by a transfer function having the form $(1/A')\{M(1-M)\}$, where A' is a transfer function similar in form to the transfer function relating the input and the output of the controlled entity, but the parameters of which may be set to known values, and where M is the transfer function defining the desired relationship between demanded output from the controlled entity and the actual output from the controlled entity;

means to apply the difference between the actual and demanded values of the output from the controlled entity to the input of said controller device;

means to apply the output of said controller device to the input of the controlled entity;

means to record the values of the input to and the corresponding output from the controlled entity over a predetermined interval of time;

a model device, adapted to relate an input thereto and an output therefrom by a transfer function of the form $A_1/(1+RA_1)$, where $A_1$ is a transfer function similar in form to the transfer function of the controlled entity but the parameters of which may be set to typical values, and R (equal to $$(1/A')\{M(1-M)\})$$

is the transfer function of the controller device;

means to set in the model device, for each predetermined interval of time, sets of trial values of the parameters of the transfer function $A_1$;

means to apply repeatedly to the input of the model device, once for each predetermined interval of time, recorded values of the input to the controlled entity;

means to determine the instantaneous difference between the output of the model device and the corresponding actual output of the controlled entity;

means to derive from said instantaneous difference an error function computed from the values of the said instantaneous difference over the said interval of time;

means to select the set of trial parameter values giving a minimum value of the error function;

and means to set the values of the parameters occurring in the transfer functions A' and R to correspond to the selected set of trial parameter values.

2. The system of claim 1 including means to apply, over the predetermined period of time, a predetermined perturbation to the demanded value of the quantity to actuate the control system and the entity.

3. The system of claim 2 including means to add to the values of the input to and the output from the controlled entity, upon their recordal by the recording means, predetermined multiples less than unity of corresponding values of the said quantities at corresponding instants over predetermined earlier intervals of time.

4. The system of claim 3 wherein the predetermined multiple in respect to the $n$th preceding interval of time is $m^n$, where $m$ is a positive quantity less than unity.

5. A self-adaptive automatic control system for the control of an aircraft about an axis thereof by actuation of an appropriate control surface, the rate of turn of the aircraft being related to the displacement of the control surface by a transfer function of known form but having parameters which may vary, the control system controlling the displacement of the control surface so that the rate of turn of the aircraft about the axis has a desired relationship to a demanded value thereof, comprising a controller device adapted to relate an input thereto and an output therefrom by a transfer function having the from $(1/A')\{M(1-M)\}$, where $A'$ is a transfer function similar in a form to that relating the displacement of the control surface and the corresponding rate of turn of the aircraft, but the parameters of which may be set to known values, and where $M$ is the transfer function defining the desired relationship between the demanded rate of turn of the aircraft and the actual rate of turn, means to apply the difference between the actual and demanded values of the rate of turn to the input of the controller device, means to displace the control surface in accordance with the output of the controller device, recording means to record the values of the controlled surface displacement and the corresponding rate of turn of the aircraft over a predetermined interval of time, a model device, adapted to relate an input thereto and an output therefrom by a transfer function of the form $A_1/(1+RA_1)$, where $A_1$ is a transfer function similar in form to that relating to the controlled surface displacement and the rate of turn of the aircraft but the parameters of which may be set to trial values and $R$, equal to $(1/A')\{M(1-M)\}$, is the transfer function of the controller device, means to set in the model device for each predetermined period of time sets of trial values of the parameters of the transfer function $A_1$, means to apply repeatedly to the input of the model device, once for each predetermined interval of time, the recorded values of the control surface displacement, means to determine the instantaneous difference between the output of the model device and the corresponding value of the rate of turn of the aircraft, means to derive from said instantaneous difference an error function computed from the values of the said instantaneous difference over the said interval of time, means to select the set of trial parameter values giving a minimum value of the error function, and means to set the values of the parameters occurring in the transfer function $A'$ and $R$ to correspond to the selected set of trial parameter values.

6. The system of claim 5 wherein the transfer function $M$ is of the form $\omega^2/(D^2+2\zeta D+\omega^2)$, where $\omega$ and $\zeta$ are constants.

7. The system of claim 6 for the control of an aircraft having an elevator control surface for the control of the aircraft in pitch, the rate of pitch of the aircraft being related to the displacement of the elevator by a transfer function of the form $a(D+b)/(D^2+cD+d)$, where $a, b, c, d$, are parameters depending on the aircraft.

8. The system of claim 7 including means to develop an auxiliarly elevator displacement signal in accordance with the difference between the demanded and actual values of the rate of pitch of the aircraft operated upon by a transfer function of the form $K(1-M)$ where $K$ is a constant, and means to displace the elevator in accordance with said auxiliary elevator displacement signal.

9. The system of claim 8 including means to develop a gust compensation signal in accordance with the actual rate of pitch of the aircraft operated on by an operator at least approximately equal to $$K/(1-M)+(1/A')\{M(1-M)\}$$

and means to add said gust compensation signal to the elevator displacement signals prior to application of the elevator displacement signals to the input of the recording means.

10. The system of claim 7 including means to apply, over the predetermined period of time, a predetermined perturbation to the demanded value of rate of pitch of the aircraft.

11. The system of claim 10 including means to add to the values of the elevator displacement and rate of pitch, upon their recordal by the recording means, predetermined multiples less than unity of corresponding values of the said quantities at corresponding instants over predetermined earlier intervals of time.

12. The system of claim 11 wherein the predetermined multiple in respect of the $n$th predetermined interval of time in $m^n$, where $m$ is a positive quantity less than unity.

References Cited
UNITED STATES PATENTS

| | | | |
|---|---|---|---|
| 3,230,351 | 1/1966 | Platt et al. | 318—489 XR |
| 3,327,306 | 6/1967 | Ellert et al. | 318—18 XR |
| 3,361,394 | 1/1968 | Pfersch | 318—489 XR |

BENJAMIN DOBECK, Primary Examiner

U.S. Cl. X.R.

318—28